United States Patent
Salla et al.

(10) Patent No.: US 11,682,013 B2
(45) Date of Patent: Jun. 20, 2023

(54) PARALLEL PROCESSING IN IDLE STATES OF A TRANSACTION PROCESSING PROTOCOL

(71) Applicant: Marqeta, Inc., Oakland, CA (US)

(72) Inventors: Jatin Salla, Pleasanton, CA (US); Pradeep Raju, Mountain View, CA (US); Amiel Montecillo, Brentwood, CA (US)

(73) Assignee: MARQETA, INC., Oakland, CA (US)

( * ) Notice: Subject to any disclaimer, the term of this patent is extended or adjusted under 35 U.S.C. 154(b) by 0 days.

(21) Appl. No.: 17/348,355

(22) Filed: Jun. 15, 2021

(65) Prior Publication Data

US 2022/0398578 A1   Dec. 15, 2022

(51) Int. Cl.
  *G06Q 20/40*   (2012.01)
(52) U.S. Cl.
  CPC .................... *G06Q 20/401* (2013.01)
(58) Field of Classification Search
  CPC .................................................. G06Q 20/401
  See application file for complete search history.

(56) References Cited

U.S. PATENT DOCUMENTS

| | | | | |
|---|---|---|---|---|
| 7,636,718 | B1* | 12/2009 | Steen | G06Q 10/10 700/235 |
| 10,721,260 | B1* | 7/2020 | Schlarp | G06F 21/577 |
| 11,023,528 | B1 | 6/2021 | Lee | |
| 2007/0169052 | A1* | 7/2007 | Vanrenen | G06F 11/28 717/154 |
| 2012/0197781 | A1* | 8/2012 | Valetutti | G06Q 20/4016 705/38 |
| 2012/0254887 | A1* | 10/2012 | Rodriguez | G06F 16/2379 718/106 |
| 2016/0178801 | A1* | 6/2016 | Bobrek | G01V 99/005 703/2 |
| 2017/0024211 | A1* | 1/2017 | Toyoda | G06F 9/3824 |
| 2017/0161733 | A1 | 6/2017 | Koletsky | |
| 2017/0345008 | A1 | 11/2017 | Ford | |
| 2019/0146829 | A1* | 5/2019 | Cheng | G06F 15/7871 718/108 |
| 2020/0143376 | A1* | 5/2020 | Manoharan | G06Q 20/4016 |
| 2021/0374208 | A1* | 12/2021 | Collier | G06F 9/5066 |

OTHER PUBLICATIONS

ProMAX Educational Blog, "What is the purpose of a computer server" by Matthew Mister, dated Sep. 25, 2019 https://www.promax.com/blog/what-is-the-purpose-of-a-computer-server (Year: 2019).*

(Continued)

*Primary Examiner* — Gregory S Cunningham, II
*Assistant Examiner* — Raven E Zeer
(74) *Attorney, Agent, or Firm* — Ray Quinney & Nebeker P.C; James Bullough

(57) ABSTRACT

Server computers of card issuer-processors can determine a mapping of dependencies of a plurality of components of a card processing protocol and create groups of components that can be executed in parallel. The groups of the components are sequentially processed within a limited time period.

18 Claims, 5 Drawing Sheets

(56) References Cited

OTHER PUBLICATIONS

Siti Hafizah Ab. Hamid; Mohd Hairul Nizam M. Nasir; Wong Yew Ming; and Hazrina Hassan; "Improving Response Time of Authorization Process of Credit Card System Using Multi-Threading and Shared-Memory Pool Techniques;" 2008; Journal of Computer Science, Science Publications (Year: 2008).*
Nurul Huda Binti Ahmad Zahari; "A Security Payment Model for Financial Payment Using Mykad" Apr. 2011, Universiti Tun Hussein Onn Malaysia (Year: 2011).*
Mucahit Gundebahar; and Sinem Zeynep Bastas; "Periodic Transaction Processing Architecture with High Performance in Financial Systems" 2016; IEEE (Year: 2016).*
EESR received from EPO for EP Patent Application No. 21188274.1-1213, mailed on Feb. 2, 2022, 10 pages.
Anonymous: "Parallel computing—Wikipedia", Sep. 28, 2016 (Sep. 28, 2016), pp. 1-21, XP055859109, 21 pages, Retrieved from the Internet: URL: https://en.wikipedia.org/w/index.php?title=Parallel_computing&oldid=741532971.
JPOS Software SRL, jPOS Programmer's Guide, Version 2.1.5, Nov. 2, 2020; 152 pages.

\* cited by examiner

PARALLEL PROCESSING IN IDLE STATES OF A TRANSACTION PROCESSING PROTOCOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2020-2021 Marqeta, Inc.

TECHNICAL FIELD

One technical field of the present disclosure is computers programmed to execute high-speed, high-volume transaction protocols and messaging. Another technical field is computer-implemented real-time memory cache management. Yet another technical field is parallel processing or concurrent processing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Online computer-implemented payment card transaction systems are architected to process thousands to millions of transactions, each involving a request, decision logic, transformation of data, and response, within brief real-time periods while cardholders or other parties are waiting on transactions, and with mandatory fixed maximum times for processing. These systems are termed real-time transaction systems because they are required to generate digital data requests, execute decision logic, transform data, and respond with other digital data within milliseconds to seconds while real-world activities are occurring, such as consumer purchases at a point of sale. Attributes of these systems include processing times and a scale of throughput and transaction volume that far exceed human capacity and require computer implementation.

The implementation of these services requires the use of distributed systems of computers in which end-user computing devices, point of sale systems, application servers or other systems of customers, servers of service providers, and servers of payment networks are independent and usually geographically distant from one another. Therefore, high-speed request-response message communication is required among the functional elements of the system. In many cases, a particular transaction can start, undergo processing, receive authorization or approval, and complete only when all such systems are online and responsive.

Thus, the requirement of these systems for real-time response and extremely high transaction throughput makes the systems sensitive to network outages, server outages, or other failures of units of the distributed systems. Unless protective measures are implemented, one computer or process will experience repeated timeouts as requests are sent and responses are not received. Systems operating in this manner consume unnecessary CPU cycles, network bandwidth, memory and storage usage to create requests, enter wait states, branch to failure code, and log errors.

There is a need to reduce these and other technical consequences of failure or unreliability in high-speed, distributed transaction processing systems.

SUMMARY

The appended claims may serve as a summary of the invention.

DETAILED DESCRIPTION

Figure 1:
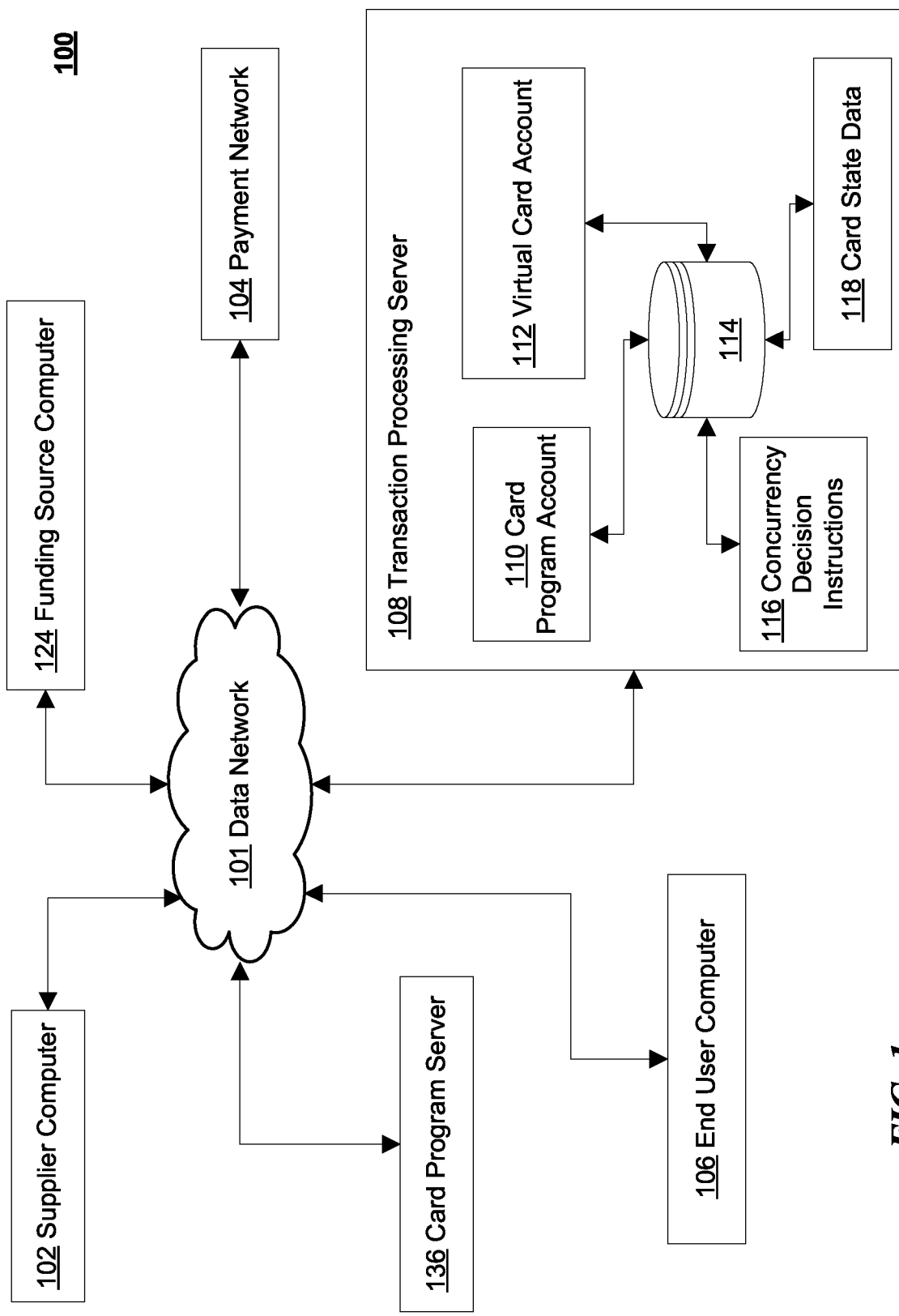
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
  1. General Overview
  2. Structural Overview
  3. Functional Overview
    3.1 Parallel Processing Using Groupings Based On Dependencies
  4. Implementation Example—Hardware Overview
  5. Extensions And Alternatives; Benefits And Improvements

1. General Overview

In one embodiment, card issuer-processors implement certain payment card processing functions using high-speed, cloud-based server computers and computing instances. The payment card may be a card, plastic credit card, charge card, virtual cards, tokenized cards, or other form of payment card, including chip-based cards, magstripe contactless cards. These systems support transaction services for end users (e.g., card holders), who are individuals who buy products or services from suppliers or merchants, which are business entities. Requests, data, and responses concerning the movement of money or value among accounts occur using a payment network. Some services also act as an issuer of virtual payment cards to end users on behalf of card program operators, which is an entity that customizes the payment card functionalities. Issuing banks also issue cards and link cards to cardholder accounts. All the aforementioned parties use distributed systems of computers that are linked by open internetworks and private, secure payment networks. While some aspects of this disclosure focus on implementation examples using card transaction protocols, embodiments may be implemented in the context of transaction or messaging protocols that do not involve card payments but involve the same kinds of time limits and/or scale as described herein.

When a cardholder attempts to use a payment card for purchases or other bank-related services, a payment network provides a transaction validation request to a payment processor, or otherwise referred herein as a transaction processing server. The payment network typically requires the transaction processing server to complete its validation processes and provide a response to the validation request within a specified time, such as seven (7) seconds. Considering the hundreds or thousands of transactions that the transaction processing server may need to process every second, improving and maintaining high-efficiency of the validation processes are important to be able to respond to the validation request within time.

Embodiments of this disclosure provide benefits and improvements to the validation process for validating a payment transaction by organizing various components of a card processing protocol into groups, where the components within each group are processed in parallel with respect to each other and the groups themselves are processed sequentially. These embodiments leverage the idle periods that a transaction processing server experiences when executing certain components of the card processing protocol by executing one or more other components that can be independently executed during such idle periods.

In one aspect, a computer-implemented method for parallel processing of a plurality of components of an e-commerce transaction protocol, executed by one or more computer devices of a transaction processing server, comprises: receiving, from a payment network computer, a validation request message to validate a transaction associated with a digital electronic payment account; identifying a plurality of components of the e-commerce transaction protocol that are associated with the transaction; determining a mapping of dependencies between each of the plurality of components to create and store a digital memory representation of a topological ordering for processing the plurality of components; creating and storing in the digital memory, based on the topological ordering, a plurality of groups for the plurality of components, each group comprising one or more components of the plurality of components that can be processed independently from each other; sequentially processing the plurality of groups by processing the one or more components that are associated with each group of the plurality of groups before processing the one or more components that are associated with a next group of the plurality of groups, the one or more components associated with each group of the plurality of groups being processed in parallel; determining, based on the processing of the plurality of components, whether to validate the transaction; transmitting, to the payment network computer, a response to the validation request indicating whether the transaction is validated.

In one feature, the method further comprises performing the sequentially processing the plurality of groups only during an idle period of the e-commerce transaction protocol during which the transaction processing server is waiting for a required response from another computer. In that feature, a sum of the idle period and a time to execute the sequentially processing, the determining, and the transmitting is limited in time in the e-commerce transaction protocol to a maximum of seven (7) seconds.

In a further feature, the method further comprises executing a first sequence of operations of the e-commerce transaction protocol, including transmitting a second request to another computer; entering an idle period of the e-commerce transaction protocol during which the transaction processing server is waiting for a required response from another computer; performing the sequentially processing the plurality of groups only during the idle period. In this feature, a sum of the idle period and a time to execute the sequentially processing, the determining, and the transmitting may be limited in time in the e-commerce transaction protocol to a maximum of seven (7) seconds.

2. Structural Overview

FIG. 1 illustrates a distributed computer system showing the context of use and principal functional elements with which one embodiment could be implemented.

In an embodiment, a distributed computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, computer system 100 comprises a data network 101 that is communicatively coupled to a supplier computer 102, payment network 104, card program servers 136, end user computer 106, transaction processing server 108, and funding source computer 124. For purposes of illustrating a clear example, FIG. 1 shows one instance of each of the foregoing functional units, but in other embodiments, one or more of the functional units may be implemented with two or more units.

Each of the supplier computer 102, payment network 104, transaction processing server 108, and funding source computer 124 may be implemented using one or more server-class computers, clusters, virtual machines, or other computing devices. For example, transaction processing server 108 may be implemented using a fault-tolerant, scalable set of virtual computing instances in a private datacenter, public datacenter or cloud computing facility with a number of central processing units sufficient to service thousands to millions of concurrent transaction requests from the payment network 104 and originating from thousands to millions of end user computers 106, supplier computers 102, or points of sale.

Supplier computer 102 may be owned or operated by, or associated with, a supplier of goods or services, such as a merchant, to an end user who is associated with end user computer 106 or other entities or institutions. In other cases, supplier computer 102 may represent a point of sale terminal at which an individual end user appears in person to conduct a transaction. A supplier may be a retailer, reseller, value-added reseller, distributor, or other entity in a supply chain or manufacturing chain. A supplier may deal in tangible goods and/or intangible goods, using physical retail, resale, or distribution facilities and/or virtual, online stores, shopping carts, catalogs, or other facilities. The supplier or merchant may have a customer relationship with an entity, such as a card issuer-processor, that owns, operates, or is associated with the transaction processing server 108. However, a customer relationship is not required.

In one embodiment, an end user computer 106 is used and represents a mobile computing device, smartphone, laptop computer, desktop computer, or workstation that is associated with an individual end user. In some embodiments, end user computer 106 is programmed with an operating system having an internet software stack that can communicate with data network 101 using protocols such as HTTP over TCP/IP, and has an internet browser that can communicate with supplier computer 102 to transfer requests and responses using HTTP, application protocols implemented using apps on the end user computer, or other techniques. The end user computer 106 may be one source of introducing a card number for a transaction into the processes described herein, but other embodiments may receive card number or other transaction details through programmatic calls or other systems or computers (e.g., an automated teller machine (ATM)).

Data network 101 broadly represents one or more local area networks, wide area networks, internetworks, or a combination thereof, which are communicatively coupled via any of wired or wireless, terrestrial or satellite network links.

Payment network 104 is a secure, private network for communication of payment protocol messages between the computers of authorized parties such as banks, payment clearinghouses, merchants, card issuers, and card processors. Because payment network 104 comprises a plurality of computers, software, and specialized networking gear, the terms "payment network" and "payment network computer" may be used interchangeably for convenience to refer to all functional elements in a payment network.

Funding source computer 124 represents a mobile computing device, smartphone, laptop computer, desktop computer, or workstation that is associated with a funding source such as a bank, savings and loan, credit union, private lender, or other source for funding transactions. In one embodiment, funding source computer 124 and transaction processing server 108 are integrated or associated with the same issuer-processor entity. Funding source computer 124 broadly represents all computer-implemented functional elements of such an institution, including databases or data repositories that hold account data, instrument data and value data for accounts, monetary instruments in accounts, and funds or value in accounts.

Card program server 136 represents an entity such as a card program operator that operates or manages payment card programs. The card program server 136 may be associated with an entity that has a customer relationship with another entity, such as a transaction processing server, or a card issuer-processor, that owns, operates, or is associated with the computers and/or servers used to process payment transactions. However, a customer relationship is not required. The card program server 136, via the transaction processing server or the card issuing bank, is able to customize the rules and conditions in which a card could be used and manage the issuance of the card over the card's lifecycle, such as by ordering, activating, setting expiration, suspending, and terminating cards.

Transaction processing server 108 may be one or more server computers and/or virtual machine instances that are programmed to implement the functions that are further described herein. In one embodiment, transaction processing server 108 is owned or operated by a card issuer-processor, but other entities also may implement functionally equivalent computers or programs. The transaction processing server 108 may be architected with load balancing routers, multiple processors, clusters, or virtual machine instances, work queues, multithreaded programming, and parallel processing to operate with real-time response to requests from payment network 104 as end user computers 106, supplier computers 102, or card program servers 136 are conducting transactions at the scale of thousands to millions of requests per second. A transaction processing server 108 may also be referred to as an access control server.

In one embodiment, transaction processing server 108 comprises a digital storage device or database 114 that is programmed with a database schema or other form of organized, high-speed, digital storage and manages a card program account 110, card account 112, concurrency decision instructions 116, and card state data 118. Database 114 may represent any digital data storage device or repository including combinations of database clusters, relational databases, object storage or other repositories.

Card program account 110 represents a digitally stored association of data that describes a card program operator, such as one associated with a card program server 136. Card program account 110 enable the system to differentially process stored program rules for different suppliers to implement different policy concerning approval of transactions, use of cached balances, and/or denial of transactions.

Virtual card account 112 represents a virtual payment card that has been issued to a party such as an end user who is associated with end user computer 106. Each card account 112 is associated with a digitally stored cached balance value 116, which represents an amount of value that is available for payment of purchases for which the card is presented.

Concurrency decision instructions 116 represents operations programmed to be executed by the transaction processing server 108 to determine the dependencies between components of a card processing protocol and, based on the determined dependencies, groupings of the components to allow parallel processing of the components within each group.

Card state data 118 represents a digitally stored set of attributes or values for a state of a card, its balance, and other attributes of a card account. Card state data 118 enables the system to maintain a record of card state when card program server 136 is offline and cannot be messaged or programmatically queried to obtain a funding decision, authorization decision, or approval decision. By digitally storing the card state data 118 at database 114, the transaction processing server 108 may be programmed to transmit the card state data to the card program server 136 when it returns online, enabling synchronization of card account details between the transaction processing server and the card program server 136. In an embodiment, the stored card state data 118 is associated with the particular card program 110 of a card program server 136 that was offline, using a card program operator identifier value, other identifier, or pointer.

For purposes of clarity, FIG. 1 illustrates one instance of the card program account 110, card account 112 with cached balance value 116, and card state data 118. In practical embodiments, transaction processing server 108 may be architected with sufficient CPU power, memory, and storage to process thousands of card program accounts 110, as well as millions of card accounts 112 and associated card state data 118.

Computer system 100 is a high-speed, high-throughput, scalable system planned for real-time processing of card payment transactions as they occur. In this context, "real-time" response refers to receiving a request from payment network 104 to approve or decline a transaction, executing decision logic at transaction processing server, transmitting messages to one or more of supplier computer 102, card program server 136, funding source computer 124, and payment network 104 to obtain decisions or data, and transmitting a response to the payment network within an amount of time that end users or suppliers will tolerate as reasonable to conduct a transaction. In some embodiments, the total time for executing the foregoing steps is three (3) seconds to seven (7) seconds.

3. Functional Overview

Figure 2A:
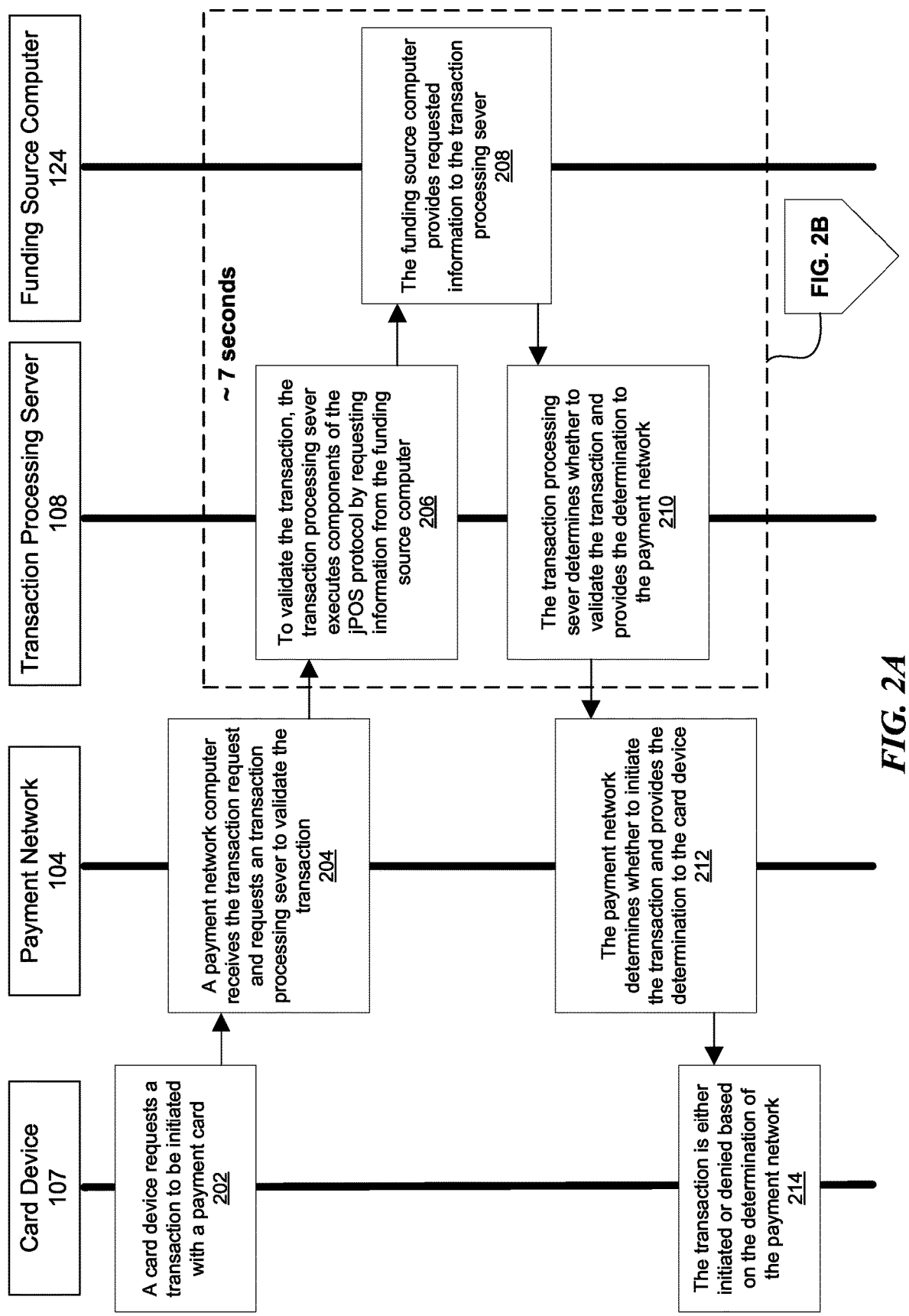
FIGS. 2A and 2B are a flow diagrams of one embodiment of an algorithm that can be programmed to implement the disclosure.
Figure 2B:
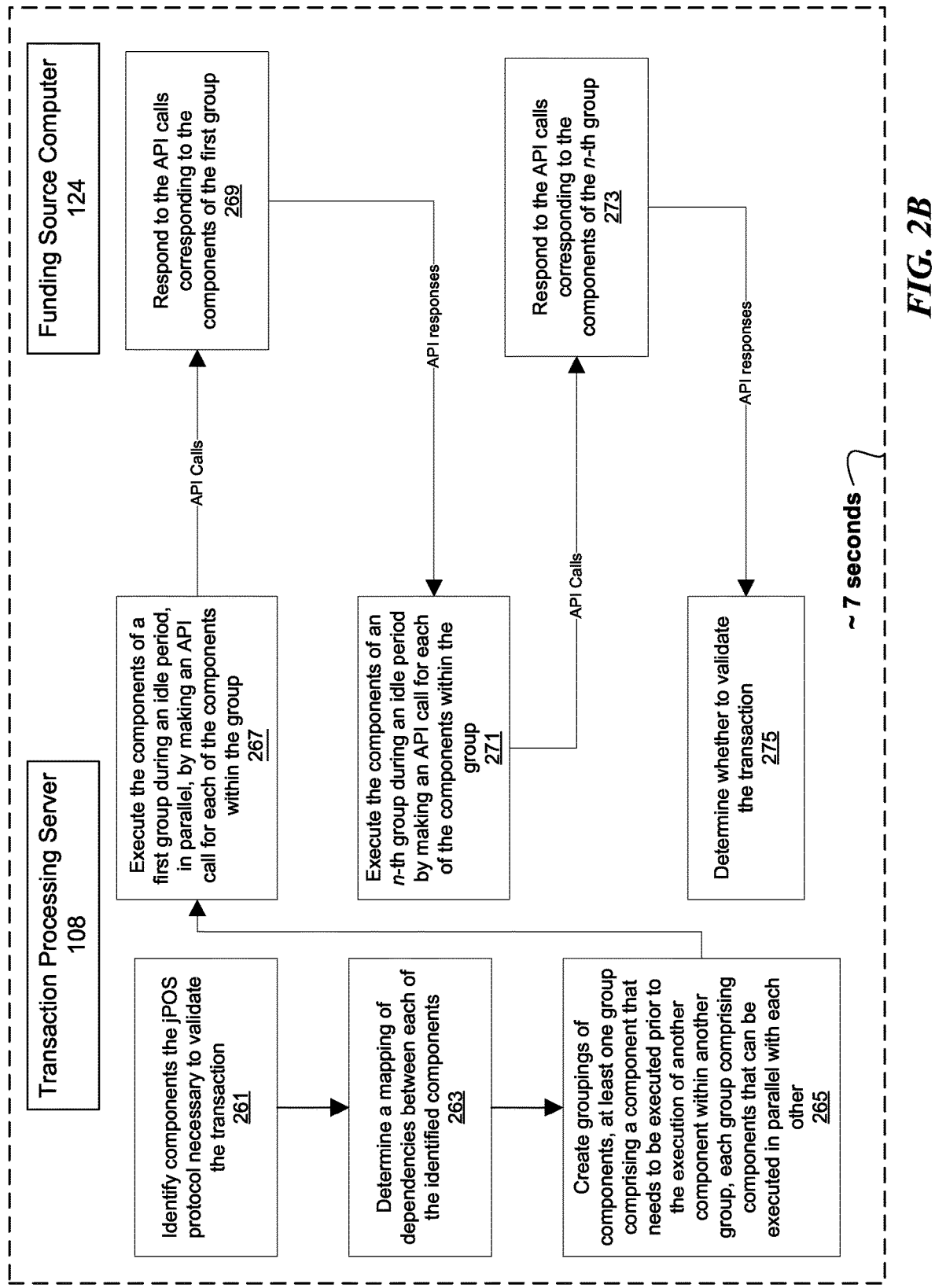
Figure 3:
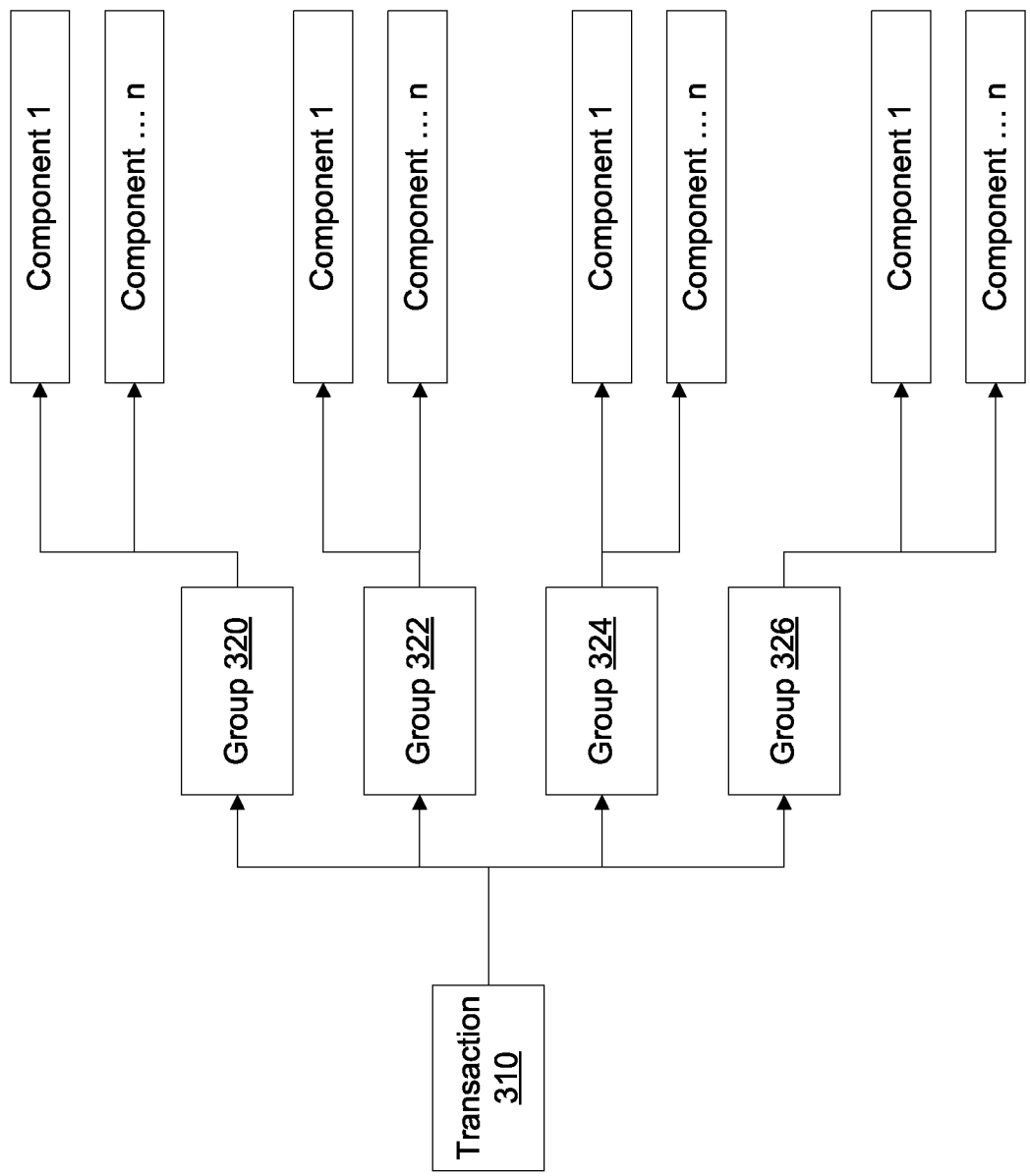
FIG. 3 illustrate a diagram of an algorithm that may be programmed for use in conjunction with FIGS. 2A and 2B.

FIGS. 2A and 2B are a flow diagram of one embodiment of an algorithm that can be programmed to implement the disclosure. FIG. 3 illustrates algorithms for other example processes that may be programmed for use in conjunction with FIGS. 2A and 2B. In one embodiment, concurrency decision instructions 116 of the transaction processing server 108 is programmed to execute the portions of the functions illustrated in FIG. 2A, FIG. 2B, and FIG. 3.

FIGS. 2A and 2B and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In an embodiment, the algorithm shown in FIG. 2A begins when an end user uses a payment card to purchase goods or services from a supplier or for any other transactions involving the payment card. Example scenarios include an end user using a credit card on a mobile device or a computer device for online shopping or using a debit card at an ATM-related transaction. The device at which the end user uses a payment card is referred herein as a card device 107.

At block 202, in an embodiment, a card device 107 is programmed to transmit a transaction request message to the payment network 104 requesting to initiate a transaction with a payment card At block 204, upon receiving the transaction request message from the card device 107, the payment network 104 is programmed to transmit a validation request message to the transaction processing server 108 requesting validation of the transaction.

At block 206, upon receiving the validation request message, the transaction processing server 108 is programmed to execute components of a card processing protocol, or otherwise referred herein as an e-commerce transaction protocol, to validate the transaction. An example of a card processing protocol is the jPOS java library, which has been implemented in open-source software that is commercially available at the time of this writing from Alejandro Revilla via the online site jpos.org. While some embodiments herein are described in the context of jPOS, other embodiments may be implemented using other protocols and in contexts not related to payments.

Each component of the jPOS java library with respect to the validation processes described herein represents a unit of work of the jPOS java library referred to as a Participant. That is, each component of the jPOS java library, or each Participant, represents a set of operations that the transaction processing server 108 performs to validate the transaction.

Examples of such components include: retrieving initial configurations to be used by downstream processes; accessing a digital wallet associated with digital electronic payment account based on a device primary account number (DPAN) associated with the validation request message; validating a cardholder associated with the digital electronic payment account; validating a card verification value of a payment card associated with the transaction; validating a service code from track data associated with the payment card; validating a pin block received in an ISO request; validating of verifying location data associated with the transaction; validating the transaction based on merchant data; validating a chip cryptogram associated with the payment card; applying transaction controls based on a balance associated with the digital electronic payment account; and applying transaction controls based on a type of the transaction.

In an embodiment, the transaction processing server 108 executes each of the components of the card processing protocol by transmitting a request message, or by making an API call, to the funding source computer 124 to obtain information necessary to validate the transaction. In some embodiments, the transaction processing server 108 may transmit, or make an API call, to other entities such as a supplier computer 102, card program server 136, payment network 104, or the end user computer 106 to validate the transaction, using the same or similar techniques described herein in reference to the funding source computer 124. In an embodiment, the transaction processing server 108 comprises a hardware security module (HSM) that executes validation processes for validating PIN, CHIP data, or dynamic CVV.

At block 208, upon receiving a request message or an API call from the transaction processing server 108, the funding source computer 124 is programmed to provide the requested information to the transaction processing server 108.

In an embodiment, based on the type of a transaction, different components of the protocol may need to be executed to validate the transaction. Examples of the different types of transactions include online purchases using the various types of payment cards (e.g., a credit card, or debit card, or pre-loaded card such as a gift card), in-person retail purchases using the various types of payment cards, and ATM-related transactions. Upon receiving a request to validate a transaction from the payment network 104, the transaction processing server is programmed to identify the various components of the card processing protocol necessary to validate the transaction for that type of transaction.

In some embodiments, the components of the card processing protocol are organized in a particular order that so that certain components are executed before others. In some embodiments, the components of the card processing protocol are organized in groups, such that components within one group can be executed in parallel with respect to other components within the group. Additional details of these embodiments and how the various components of the card processing protocol are executed in sequence or in parallel are discussed in more detail below, with references to FIGS. 2A, 2B, and 3.

As an illustration the validation process illustrated in blocks 206 and 208, the transaction processing server 108 may, upon receiving a validation request message from the payment network 104, programmatically determine that initial configurations associated with the payment card used for the transaction need to be prepared and/or retrieved from the funding source computer 124. This retrieving/preparing operation is an example of a component of the jPOS java library that the transaction processing server may execute. After retrieving/preparing the initial configurations, the transaction processing server 108 may programmatically determine whether the payment card used for the transaction is a valid payment card that was issued by the funding source computer 124 by making an API call to the funding source computer 124 to verify that information. This operation is another example of a component of the jPOS java library. Despite the illustrations of FIGS. 2A and 2B, the transaction processing server 108 may execute multiple components (e.g., make multiple API calls) in sequence during the validation process. In other words, the validation process described herein may require multiple back-and-forth exchanges between the transaction processing server 108 and the funding source computer 124.

In some embodiments, replicas of the databases of funding source computer 124 may be programmatically created and maintained to allow the transaction processing server 108 to retrieve data or information needed to validate the transaction. This allows the validation processes to continue in scenarios where the funding source computer 124 and/or its databases are offline or otherwise not responsive. For example, the replicas of the databases of funding source computer 124 may be created as RAID databases.

At block 210, the transaction processing server 108 is programmed to determine whether the transaction should be validated. In some embodiment, this determination may occur after the transaction processing server 108 has fully executed all of the components of the card processing protocol that it identified as being necessary to validate the transaction. In other embodiments, the transaction processing server 108 may make that determination prior to executing all of the components of the card processing protocol that it identified as being necessary to validate the transaction. For example, if the transaction processing server 108 determines that the payment card used for the transaction does not have a valid payment card account with the funding source computer 124 prior to executing all of the components, the transaction processing server 108 may programmatically stop executing additional components and determine that the transaction cannot be validated.

In an embodiment, the transaction processing server 108 may be required to complete the validation process illustrated in blocks 206, 208, and 210 within a particular time period. For example, the payment network 104 may be programmed to enforce a maximum response time of seven (7) seconds for the validation request provided to the transaction processing server 108. If the transaction processing server 108 does not respond to the validation request within the specified time period, the payment network 104 may be programmed to assume that the transaction cannot be validated. The enforcement of these time limits may be programmed, for example, using a clock thread that executes asynchronously with respect to operations the transaction processing server 108 and watches or monitors timestamp values that are entered in a log file or in memory of the payment network 104 (or a separate independent system) to determine whether the elapsed time for executing the process exceeds the programmed time limit. If the clock thread determines that the elapsed time exceeds the programmed limit, then the clock thread may be programmed to interrupt or halt the operations of the transaction processing server 108 or return a failure message to the payment network 104. In some embodiments, the maximum response time may be specified by the payment network 104. In other embodiments, the maximum response time may be specified by the card processing protocol.

The operations depicted in blocks 206, 208, and 210 are described with additional detail below, with references to FIG. 2B.

At block 212, upon receiving the validation determination from the transaction processing sever 108, the payment network 104 is programmed to provide a determination of whether the transaction should be initiated to the card device 107 based at least on the validation determination.

At block 214, upon receiving the determination from the payment network 104, the card device 107 is programmed to allow or deny the transaction based at least on the payment network 104's determination.

Some components of the card processing protocol described herein for FIGS. 2A and 2B are dependent on other components, such that some components can only be executed after other components are first executed. For example, prior to determining whether the card verification value (CVV) of a payment card was entered correctly for a transaction (i.e., component 1), the payment card used for the transaction must first be validated as being a valid payment card issued by a funding source computer 124 (i.e., component 2). In this example, component 2 must be executed prior to component 1. Such dependencies require the transaction processing server 108 to wait for some components to be fully executed before other dependent components can be executed (e.g., making an API call to the funding source computer 124 then waiting to receive the requested information before moving onto the next component). This waiting period, also referred herein as the idle period, creates a bottleneck issue for the validation processes. Thus, in some embodiments, the transaction processing server 108 leverages the idle periods to execute multiple components in parallel that do not have any dependencies with each other. For example, if the transaction processing server 108 executes a component that creates an idle period because another component depends on the execution of the previous component, the transaction processing server 108 may also execute one or more other components, during the idle period, that do not have any dependencies with the component being executed.

Referring now to FIG. 2B, the operations depicted in blocks 206, 208, and 210 from FIG. 2A are described with additional details to illustrate the processes relating to determining a mapping and groupings of the components of the card processing protocol, parallel processing of the components, and the idle periods during which parallel processing occurs. In an embodiment, once the transaction processing server 108 receives a validation request message to validate a transaction, at block 261, the transaction processing server 108 is programmed to identify components of the card processing protocol necessary to validate the transaction. Components may be functional elements of jPOS or the protocol of FIG. 2A, FIG. 2B, or other protocols, in various embodiments.

At block 263, the transaction processing server 108 is programmed to determine a mapping of the dependencies between each of the identified components. For example, the transaction processing server 108 may determine that before certain components can be executed, other components may need to be executed first. Such dependencies are mapped out by the transaction processing server 108.

At block 265, the transaction processing server 108 is programmed to group components of the card processing protocol (e.g., jPOS or the protocol of FIG. 2A, FIG. 2B) based on their dependencies to allow parallel processing or concurrent processing of those components during the idle periods described herein. The components of the card processing protocol are organized into groups to include components that can be independently executed with respect to each other. Grouping allows all components within one group to be executed in parallel without the need to wait for any one of the components to be fully executed.

For example, FIG. 3 illustrates an organization chart that shows an example grouping of the various components of the card processing protocol. For a given transaction 310, the components of the card processing protocol may be organized into four groups (e.g., group 320, group 322, group 324, and group 326). In this example, the transaction processing server 108 is programmed to begin with Group 320 by executing all of its components, which may include n number of components. Once all of the components within Group 320 are fully executed (e.g., all API calls have been returned), the transaction processing server 108 then executes all of the components of Group 322, then repeats the same operations for Groups 324 and 326 until all components necessary to validate the transaction are executed. While FIG. 3 illustrates an embodiment where components of the card processing protocol are organized into four separate groups, any number of groups can be created for the validation process. In an embodiment, the groupings of the components are pre-determined prior to the transaction processing server 108 receiving the validation request message.

In an embodiment, the dependencies between the components of the card processing protocol are mapped out and codified to allow the components of the card processing protocol to be grouped together after the transaction processing server 108 receives the validation request message. In such embodiment, the transaction processing server 108 is programmed to receive the validation request, determine the type of the transaction, identify the components of the card processing protocol necessary to validate the transaction, then dynamically create groupings of the identified components based on the codified dependencies.

In an embodiment, the dependencies between the components of the card processing protocol may be codified based on a topological ordering, which may involve generating a directed acyclic graph (DAG) based on the dependencies of the components of the card processing protocol. Topological ordering specifies a scheduling of a sequence of jobs, or operations, based on their dependencies such that certain operations are completed before another operation. A DAG is a graphical representation that may be generated based on the topological ordering of operations.

Referring again to FIG. 2B, at block 267, the transaction processing server 108 is programmed to execute the components of a first group of the components by making API calls to the funding source computer 124. Given that at least one particular component of the first group needs to be fully executed before another component in the next group can be executed, the transaction processing server 108 is programmed to wait for that particular component to be fully executed before moving on to the next group. Leveraging this waiting period, or idle period, the transaction processing server 108 is programmed to execute several other components within the first group that were previously determined as being independent with respect to each other, thereby executing them in parallel. In an embodiment, the transaction processing server 108 executes the components of a group by making API calls to the funding source computer 124 without waiting for the funding source computer 124 to response to any of the API calls.

At block 269, the funding source computer 124 is programmed to respond to the API calls received from the transaction processing server.

Once all the API responses have been received, timed-out, or otherwise determined as nonresponsive, at block 271, the transaction processing server 108 is programmed to execute the next group of components in the same manner as described with reference to block 267.

At block 273, the funding source computer 124 is programmed to respond to the API calls received from the transaction processing server.

At block 275, the transaction processing server 108 is programmed to determine whether the transaction should be validated. As noted above, the transaction processing server may be limited a maximum response time of approximately seven (7) seconds to execute the entire process illustrated in FIG. 2B.

4. Implementation Example— Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
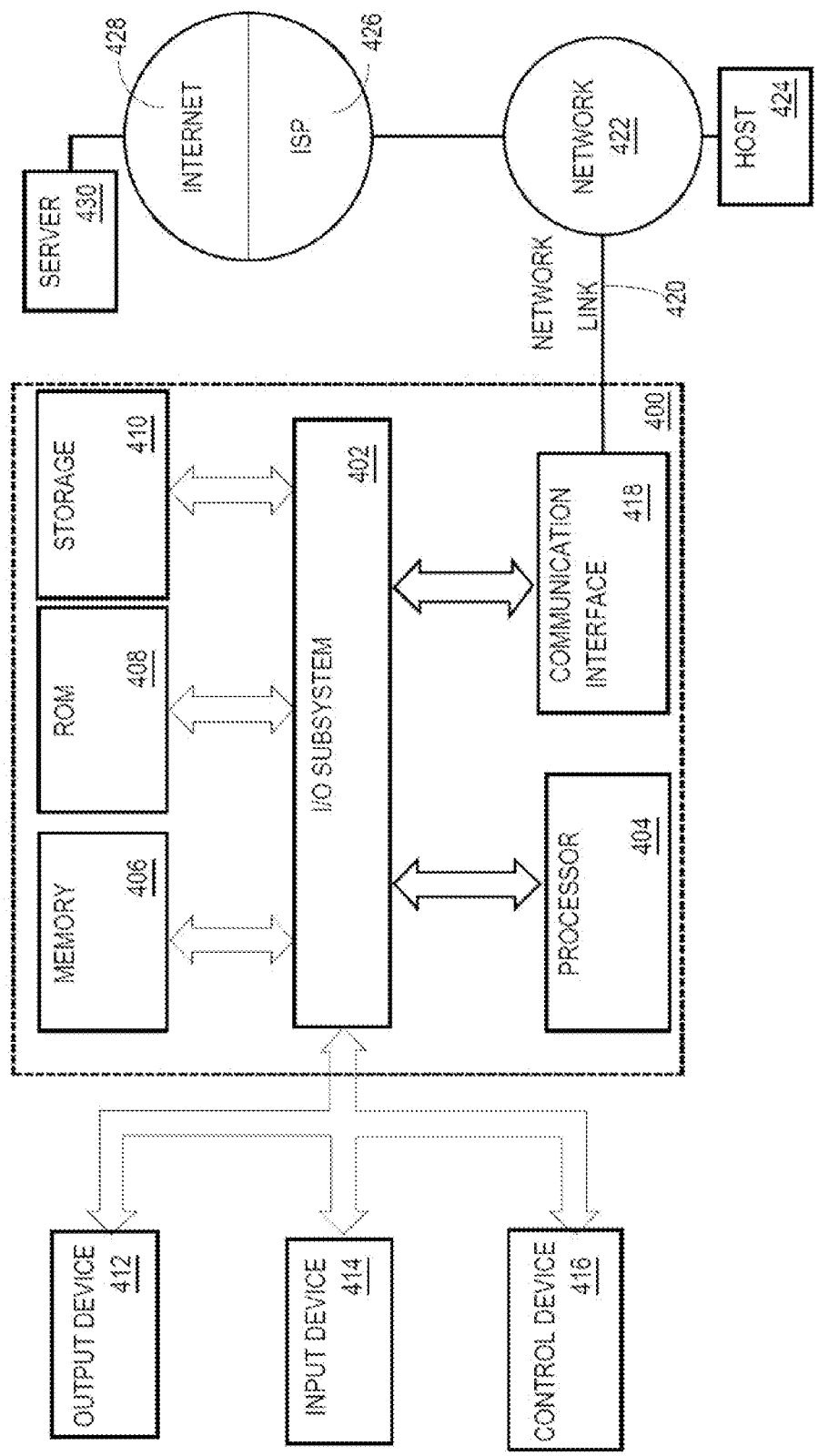
FIG. 4 illustrates a computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

5. Extensions and Alternatives; Benefits and Improvements

Embodiments allow a transaction processing server to more efficiently process a validation request from a payment network by executing multiple components of a card processing protocol in parallel during certain idle times, all within a limited time period, e.g., seven (7) seconds, specified by the payment network. The disclosure to this point has explained that various components of the card processing protocol can be grouped together to be executed during specific idle times, to allow parallel processing of such components. In some embodiments, this technique involves mapping out the dependencies between the components and codifying the dependencies based on topological ordering. This allows the various groups of components of the card processing protocol to be executed in parallel during certain idle times, further allowing faster and more efficient processing of the components of the card processing protocol, all within the brief period of time allowed for such processing. Attributes of these systems include processing times and a scale of throughput and transaction volume that far exceed human capacity and require computer implementation.

The technological improvements provided by the embodiments of this disclosure (e.g., increase in speed and efficiency of the validation process) are critical improvements in view of the recent trends of e-commerce, particularly when compared to the traditional methods of processing the card processing protocol (e.g., sequential processing of card processing protocol). As discussed above, validation requests from a payment network are limited to a specific time window, meaning that any validation process that takes longer than the time window may be deemed a failure. If a validation process fails, the payment network may reject the transaction. During the specified time window, transaction processing servers are required to perform a wide range of tasks that involves generating digital data requests, executing decision logic, transforming data, and responding with other digital data, all within milliseconds to seconds while real-world activities are occurring, such as consumer purchases at a point of sale. Transaction processing servers may also be required to validate hundreds or thousands of transactions per second. This validation process is becoming increasingly more difficult to accomplish within the time limitation specified by the payment network, in part, due to the astronomical increase in the volume of online transactions in recent times. In addition to the increased volume of online transactions, the validation process is also getting more complex and intricate due to, for example, technological innovations that allow consumers to purchase goods and services that they traditionally would have purchased offline (e.g., ride-sharing, food delivery, etc.). Such technological innovations make the decision logic in the validation process more complex because they introduce different types of data that needs to be processed (e.g., virtual payment accounts or cards, user rating of drivers or couriers, location data, merchant data etc.). Thus, in light of the increase in volume and complexity of payment transactions, there is a need to make the validation process more efficient and effective. This problem is addressed by the embodiments disclosed herein. These embodiments provide a solution by providing systems and methods that increase the speed and efficiency of the validation process that was not possible using traditional systems. Traditional systems and methods require each component of the payment processing protocol to be completed before executing the next component, and thus are much more inefficient than the embodiments described herein. Such traditional systems may not be able to keep up with the trends described above.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps. Throughout this disclosure, an element that is identified by a noun followed by the letter s in parentheses, as in (s), indicates that one or more of the element may be used in various embodiments.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for parallel processing of a plurality of components of an e-commerce transaction protocol, the method comprising, executed by one or more computer devices of a transaction processing server:
   receiving, from a payment network computer, a validation request message to validate a transaction associated with a digital electronic payment account;
   identifying a plurality of components of the e-commerce transaction protocol that are associated with the transaction;
   determining a mapping of dependencies between each of the plurality of components to create and store a digital memory representation of a topological ordering for processing the plurality of components;
   creating and storing in the digital memory, based on the mapping of dependencies between each of the plurality of components represented by the topological ordering, a plurality of groups for the plurality of components, each group comprising one or more components of the plurality of components that can be processed independently from each other;
   sequentially processing the plurality of groups by processing the one or more components that are associated with one group of the plurality of groups before processing the one or more components that are associated with a next group of the plurality of groups, the one or more components associated with each group of the plurality of groups being processed in parallel, the processing of each of the plurality of groups occurring only during an idle period of the e-commerce transaction protocol during which the transaction processing server is waiting for a required response from another computer, the required response relating to a particular component within a particular group;
   determining, based on processing of the plurality of components, whether to validate the transaction; and
   transmitting, to the payment network computer, a response to the validation request indicating whether the transaction is validated.

2. The method of claim 1, wherein the plurality of components of the e-commerce transaction protocol include one or more of the following processes:
   retrieving initial configurations to be used by downstream processes;
   accessing a digital wallet associated with digital electronic payment account based on a device primary account number (DPAN) associated with the validation request message;
   validating a cardholder associated with the digital electronic payment account;
   validating a card verification value of a payment card associated with the transaction;
   validating a service code from track data associated with the payment card;
   validating a pin block received in an ISO request;
   validating a chip cryptogram associated with the payment card;
   applying transaction controls based on a balance associated with the digital electronic payment account; or
   applying transaction controls based on a type of the transaction.

3. The method of claim 1, wherein the topological order indicates a required sequence of processing the plurality of components.

4. The method of claim 3, wherein creating the plurality of groups comprises organizing the plurality of components into the plurality of groups to satisfy the required sequence of processing the plurality of components.

5. The method of claim 1, wherein creating the topological order comprises generating a directed acyclic graph (DAG) based on the mapping of dependencies between each of the plurality of components.

6. The method of claim 1, wherein identifying the plurality of components of the e-commerce transaction protocol associated with the transaction comprises determining a transaction type of the transaction.

7. The method of claim 1, wherein processing at least one component associated with a second group of the plurality of groups is dependent on processing another component that is associated with a first group of the plurality of groups.

8. The method of claim 1, wherein processing one or more components associated with a group of the plurality of groups comprises retrieving data from an offline database that has been replicated from a network database.

9. The method of claim 1, wherein a sum of the idle period and a time to execute the sequentially processing, the determining whether to validate the transaction, and the transmitting are limited in time to a maximum of seven (7) seconds.

10. The method of claim 1, further comprising:
executing a first sequence of operations of the e-commerce transaction protocol, including transmitting a second request to another computer;
entering an idle period of the e-commerce transaction protocol during which the transaction processing server computer is waiting for a required response from the other computer; and
sequentially processing the plurality of groups only during the idle period.

11. The method of claim 10, wherein a sum of the idle period and a time to execute the sequentially processing, the determining whether to validate the transaction, and the transmitting are limited in time in the e-commerce transaction protocol to a maximum of seven (7) seconds.

12. A non-transitory computer-readable storage medium storing one or more sequences of instructions which when executed using one or more processors of a transaction processing server cause the one or more processors to execute steps of:
receiving, from a payment network computer, a validation request message to validate a transaction associated with a digital electronic payment account;
identifying a plurality of components of the e-commerce transaction protocol that are associated with the transaction;
determining a mapping of dependencies between each of the plurality of components to create and store a digital memory representation of a topological ordering for processing the plurality of components;
creating and storing in the digital memory, based on the mapping of dependencies between each of the plurality of components represented by the topological ordering, a plurality of groups for the plurality of components, each group comprising one or more components of the plurality of components that can be processed independently from each other;
sequentially processing the plurality of groups by processing the one or more components that are associated with one group of the plurality of groups before processing the one or more components that are associated with a next group of the plurality of groups, the one or more components associated with each group of the plurality of groups being processed in parallel, the processing of each of the plurality of groups occurring only during an idle period of the e-commerce transaction protocol during which the transaction processing server is waiting for a required response from another computer, the required response relating to a particular component within a particular group;
determining, based on processing of the plurality of components, whether to validate the transaction; and
transmitting, to the payment network computer, a response to the validation request indicating whether the transaction is validated.

13. The non-transitory computer-readable storage medium of claim 12, wherein the topological order indicates a required sequence of processing of the plurality of components.

14. The non-transitory computer-readable storage medium of claim 13, wherein creating the plurality of groups comprises organizing the plurality of components into the plurality of groups to satisfy the required sequence of processing the plurality of components.

15. The non-transitory computer-readable storage medium of 12, wherein processing one or more components associated with a group of the plurality of groups comprises retrieving data from an offline database that has been replicated from a network database.

16. The non-transitory computer-readable storage medium of claim 12, wherein a sum of the idle period and a time to execute the sequentially processing, the determining whether to validate the transaction, and the transmitting are limited to a maximum of seven (7) seconds.

17. The non-transitory computer-readable storage medium of claim 12, wherein the instructions when executed using the one or more processors of the transaction processing server further cause the processors to execute steps of:
executing a first sequence of operations of the e-commerce transaction protocol, including transmitting a second request to another computer;
entering an idle period of the e-commerce transaction protocol during which the transaction processing server computer is waiting for a required response from the other computer; and
sequentially processing the plurality of groups only during the idle period;
wherein a sum of the idle period and a time to execute the sequentially processing, the determining whether to validate the transaction, and the transmitting are to a maximum of seven (7) seconds.

18. A system comprising: one or more processors; and one or more computer-readable non-transitory storage media in communication with the one or more processors, the one or more computer-readable non-transitory storage media comprising instructions that when executed by the one or more processors, cause the system to execute steps of:
receiving, from a payment network computer, a validation request message to validate a transaction associated with a digital electronic payment account;
identifying a plurality of components of the e-commerce transaction protocol that are associated with the transaction;
determining a mapping of dependencies between each of the plurality of components to create and store a digital memory representation of a topological ordering for processing the plurality of components;
creating and storing in the digital memory, based on the mapping of dependencies between each of the plurality of components represented by the topological ordering, a plurality of groups for the plurality of components, each group comprising one or more components of the plurality of components that can be processed independently from each other;

sequentially processing the plurality of groups by processing the one or more components that are associated with one group of the plurality of groups before processing the one or more components that are associated with a next group of the plurality of groups, the one or more components associated with each group of the plurality of groups being processed in parallel, the processing of each of the plurality of groups occurring only during an idle period of the e-commerce transaction protocol during which the transaction processing server is waitin for a required response from another computer, the required response relating to a particular component within a particular group;

determining, based on processing of the plurality of components, whether to validate the transaction; and transmitting, to the payment network computer, a response to the validation request indicating whether the transaction is validated.

\* \* \* \* \*